(12) United States Patent
McDaniel

(10) Patent No.: US 11,590,610 B1
(45) Date of Patent: *Feb. 28, 2023

(54) ULTRAFAST LASER INSCRIBED STRUCTURES FOR SIGNAL CONCENTRATION IN FOCAL PLAN ARRAYS

(71) Applicant: Government of the United States, as represented by the Secretary of the Air Force, Wright-Patterson AFB, OH (US)

(72) Inventor: Sean A. McDaniel, Dayton, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 74 days.

This patent is subject to a terminal disclaimer.

(21) Appl. No.: 17/363,600

(22) Filed: Jun. 30, 2021

Related U.S. Application Data

(63) Continuation of application No. 16/374,818, filed on Apr. 4, 2019, now Pat. No. 11,103,957.

(51) Int. Cl.
  *B23K 26/362* (2014.01)
  *B23K 26/073* (2006.01)
  (Continued)

(52) U.S. Cl.
  CPC ........ *B23K 26/362* (2013.01); *B23K 26/0006* (2013.01); *B23K 26/0624* (2015.10); *B23K 26/0626* (2013.01); *B23K 26/073* (2013.01); *B23K 26/0884* (2013.01); *G01J 1/0411* (2013.01); *G02B 19/0009* (2013.01); *G02B 19/009* (2013.01); *B23K 2101/40* (2018.08); *B23K 2103/52* (2018.08); *B23K 2103/54* (2018.08)

(58) Field of Classification Search
  CPC ............. B23K 26/362; B23K 26/0624; B23K 26/0006; B23K 26/0626; B23K 26/073; B23K 26/0884; B23K 2103/52; B23K 2101/40; B23K 2103/54; G01J 1/0411; G02B 19/0009; G02B 19/009
  See application file for complete search history.

(56) References Cited

U.S. PATENT DOCUMENTS 6,040,591 A 3/2000 Otsuka
6,821,810 B1 11/2004 Hsiao et al.
(Continued)

*Primary Examiner* — Georgia Y Epps
*Assistant Examiner* — Don J Williams
(74) *Attorney, Agent, or Firm* — AFMCLO/JAZ; James F. McBride

(57) ABSTRACT

The present invention relates to ultrafast laser inscribed structures for signal concentration in focal plan arrays, focal plan arrays, imaging and/or sensing apparatuses comprising said focal plan arrays, as well as methods of making and/or using ultrafast laser inscribed structures for signal concentration in focal plan arrays, focal plan arrays, imaging and/or sensing apparatuses comprising said focal plan arrays. Such ultrafast laser inscribed structures are particularly adapted to condense broad band radiation, thus allowing increased sensing efficiencies to be obtained from imaging and/or sensing apparatuses. Such ultrafast laser inscribed structures can be efficiently produced by the processes provided herein.

16 Claims, 7 Drawing Sheets

(51) Int. Cl.
*B23K 26/0622* (2014.01)
*G01J 1/04* (2006.01)
*G02B 19/00* (2006.01)
*B23K 26/06* (2014.01)
*B23K 26/08* (2014.01)
*B23K 26/00* (2014.01)
*B23K 103/00* (2006.01)
*B23K 101/40* (2006.01)

(56) References Cited

U.S. PATENT DOCUMENTS

| 7,199,931 | B2 | 4/2007 | Boettiger et al. | |
|---|---|---|---|---|
| 11,103,957 | B1 * | 8/2021 | McDaniel | B23K 26/0624 |
| 2015/0343567 | A1 | 12/2015 | Wang et al. | |
| 2016/0294149 | A1 | 10/2016 | Vasilyev et al. | |

* cited by examiner

ULTRAFAST LASER INSCRIBED STRUCTURES FOR SIGNAL CONCENTRATION IN FOCAL PLAN ARRAYS

CROSS-REFERENCE TO RELATED APPLICATION

The present application is a continuation of U.S. patent application Ser. No. 16/374,818 filed Apr. 4, 2019, which is hereby incorporated by reference in its entry.

RIGHTS OF THE GOVERNMENT

The invention described herein may be manufactured and used by or for the Government of the United States for all governmental purposes without the payment of any royalty.

FIELD OF THE INVENTION

The present invention relates to ultrafast laser inscribed structures for signal concentration in focal plan arrays, focal plan arrays, imaging and/or sensing apparatuses comprising said focal plan arrays, as well as methods of making and/or using ultrafast laser inscribed structures for signal concentration in focal plan arrays, focal plan arrays, imaging and/or sensing apparatuses comprising said focal plan arrays.

BACKGROUND OF THE INVENTION

Two photon polymerization is used to make polymeric structures comprises cones. Such structures are used in photonic integrated circuits, photolithographic masks and small three dimensional printed structures to provide microscopic moments, support and/or light guidance. Unfortunately such structures are not mid-IR and far IR compatible. Applicant recognized that the source of such problem was that the lattice vibrational mode of such structures impeded the transmittance of the mid-IR and far IR radiation. Based on such recognition, Applicants' discovered that mid-IR and far IR compatible must be used as a starting material and that such materials can be properly processed via ultrafast laser inscription. Once such mid-IR and far IR compatible materials are properly processed, ultrafast laser inscribed structures for signal concentration in focal plan arrays are obtained. Such ultrafast laser inscribed structures, can be used to produce focal plan arrays, imaging and/or sensing apparatuses comprising said focal plan arrays.

SUMMARY OF THE INVENTION

The present invention relates to ultrafast laser inscribed structures for signal concentration in focal plan arrays, focal plan arrays, imaging and/or sensing apparatuses comprising said focal plan arrays, as well as methods of making and/or using ultrafast laser inscribed structures for signal concentration in focal plan arrays, focal plan arrays, imaging and/or sensing apparatuses comprising said focal plan arrays. Such ultrafast laser inscribed structures are particularly adapted to condense broad band radiation, thus allowing increased sensing efficiencies to be obtained from imaging and/or sensing apparatuses. Such ultrafast laser inscribed structures can be efficiently produced by the processes provided herein.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

DETAILED DESCRIPTION OF THE INVENTION

Definitions

Unless specifically stated otherwise, as used herein, the terms "a", "an" and "the" mean "at least one".

As used herein, the terms "include", "includes" and "including" are meant to be non-limiting.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

As used in this specification, the mid IR and far IR spectral regions is the spectral region of from about 1 micron to about 20 microns.

As used in this specification, the mid IR means about 1 micron to about 5 microns and far IR means greater than the mid IR region to about 20 microns.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Ultrafast Laser Inscribed Structures and Focal Plane Array

Ultrafast laser inscribed structures for signal concentration in focal plan arrays, focal plan arrays, imaging and/or sensing apparatuses comprising said focal plan arrays are disclosed.

Figure 1:
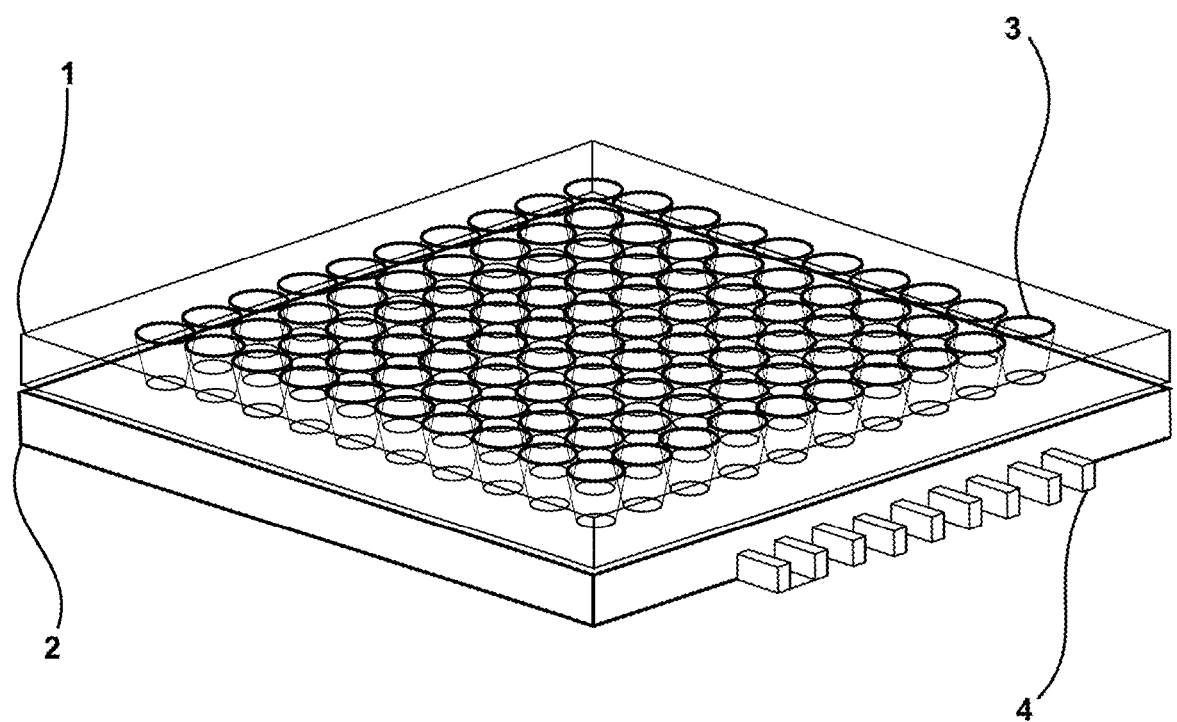
FIG. 1 is a composite view of the ultrafast laser inscribed light condensing structure coupled with an array of pixels.

An embodiment of an ultrafast laser inscribed light condensing structure coupled with an array of pixels is shown in FIG. 1. In the embodiment shown, a substrate material with ultrafast laser inscribed light condensers 1 comprising ultrafast laser inscribed condensing structures sits on a focal plane array 2 consisting of readout integrated circuits 4 and focal plane array pixels.

Figure 2:
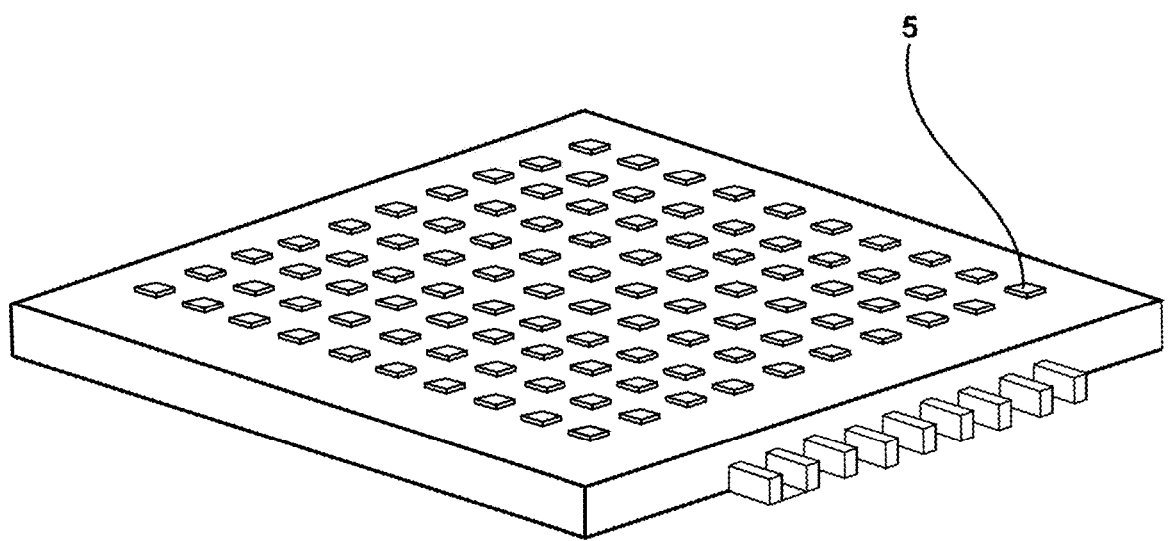
FIG. 2 is an isometric view of the pixel array representing the focal plane array, where the array of small squares represent focal plan array pixels sparsely spaced to prevent thermal and electrical cross-talk.

An embodiment of a pixel array representing a focal plane array, where the array of small squares 5 represent focal plan array pixels sparsely spaced to prevent thermal and electrical cross-talk is shown in FIG. 2.

Figure 3:
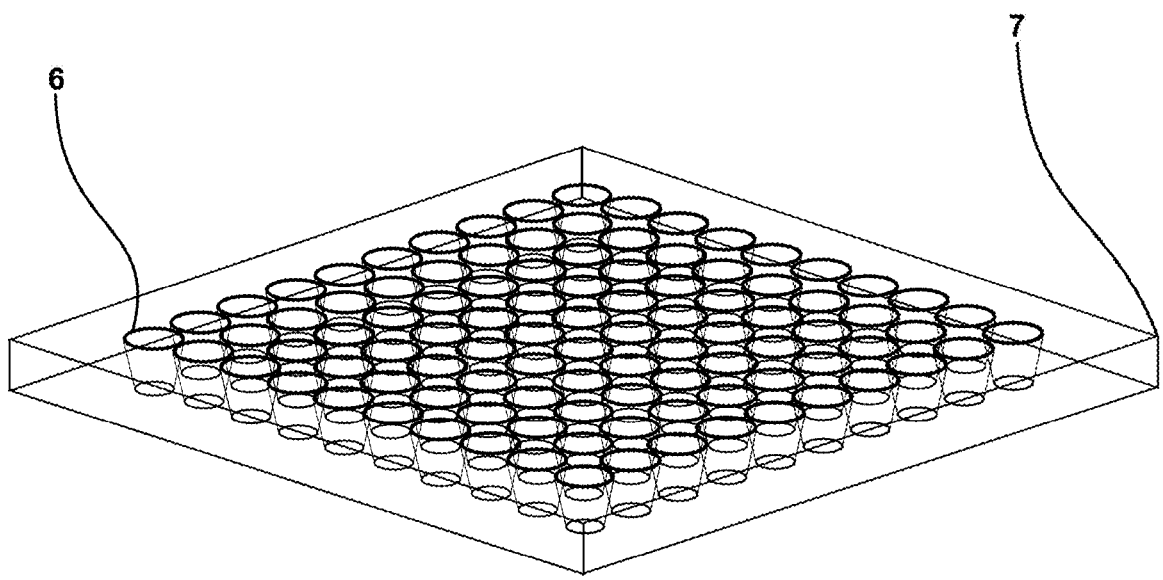
FIG. 3 is an isometric view of the light condensing structures, where the light condensing cones have been inscribed inside of the substrate material using an ultrafast laser source.

An embodiment of a transparent substrate material 6 light condensing structures/cones 7, where the light condensing cones have been inscribed inside of the substrate material using an ultrafast laser source is shown in FIG. 3.

Figure 4:
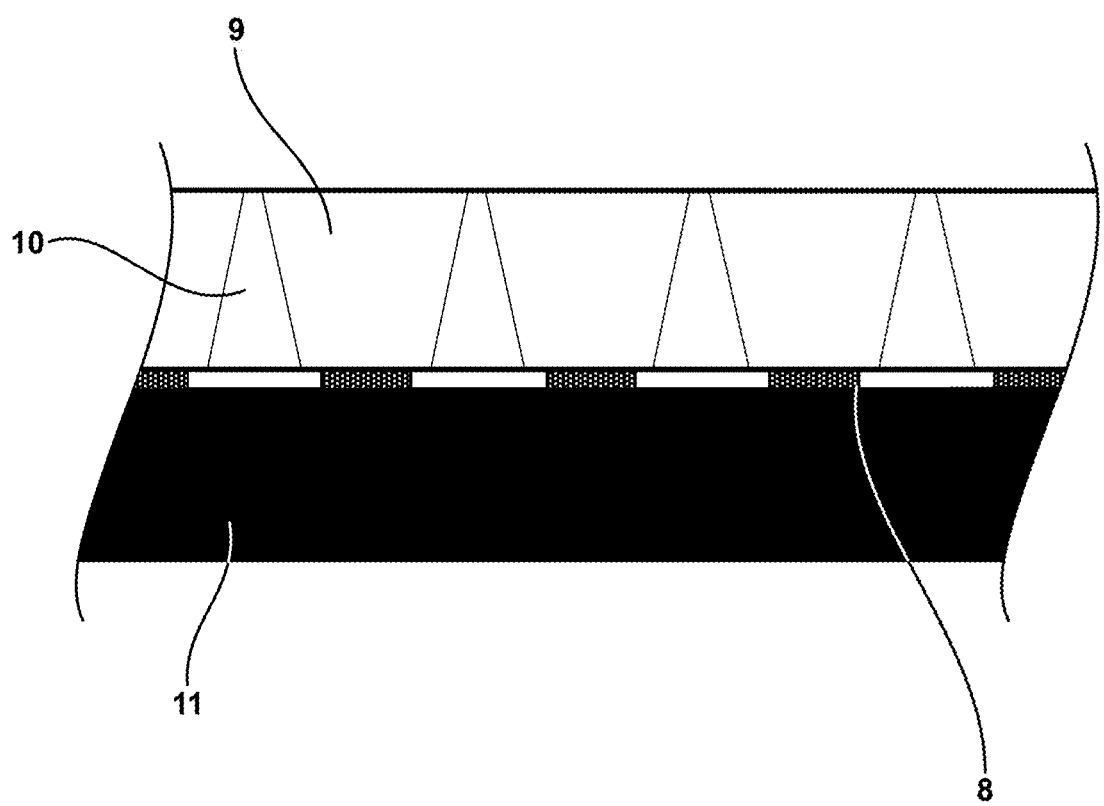
FIG. 4 is a cross-sectional view of the ultrafast laser inscribed light condensing structures contact mounted with the focal plane array, where the conical structures condense light onto the sparsely spaced pixels, which have been fabricated onto a substructure with electrical readout circuits.

A cross-sectional view of an embodiment of a substrate comprising unmodified substrate 10 and ultrafast laser inscribed light condensing structures 9 mounted on a focal plane comprising an array of pixels 8 and electrical readout circuits 11 is shown in FIG. 4.

Figure 6:
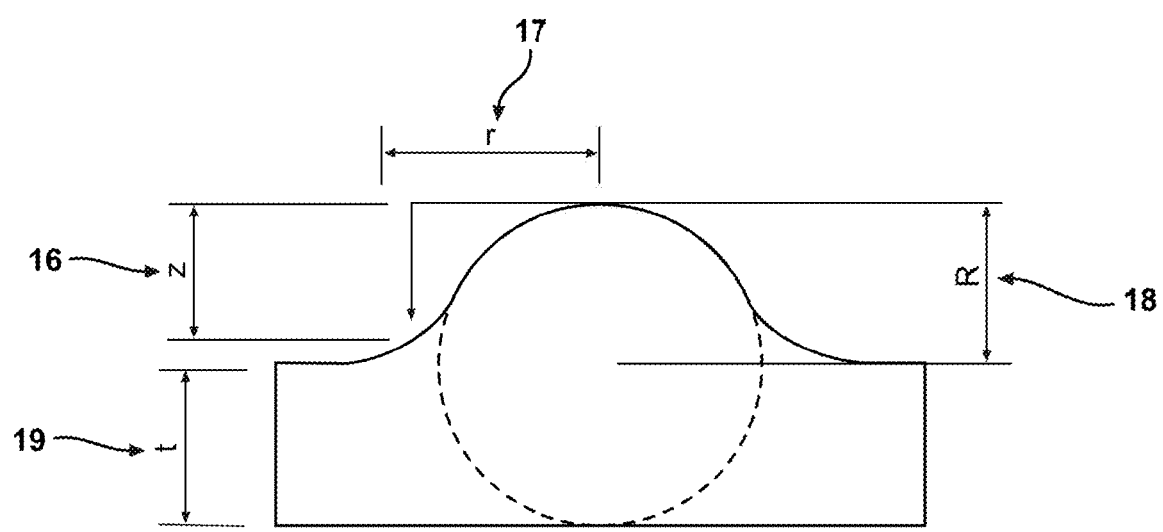
FIG. 6 is a diagram of a typical aspheric lens used for reduction of optical aberrations.

An embodiment of an aspheric lens, used for reduction of optical aberrations, wherein t 19 represents the thickness of the optic substrate, R 18 represents the radius of curvature for the spherical portion of the lens and z 16 represents the displacement of the surface from the vertex, at radial distance away from the vertex r 17 from the axis is shown in FIG. 6.

Figure 7:
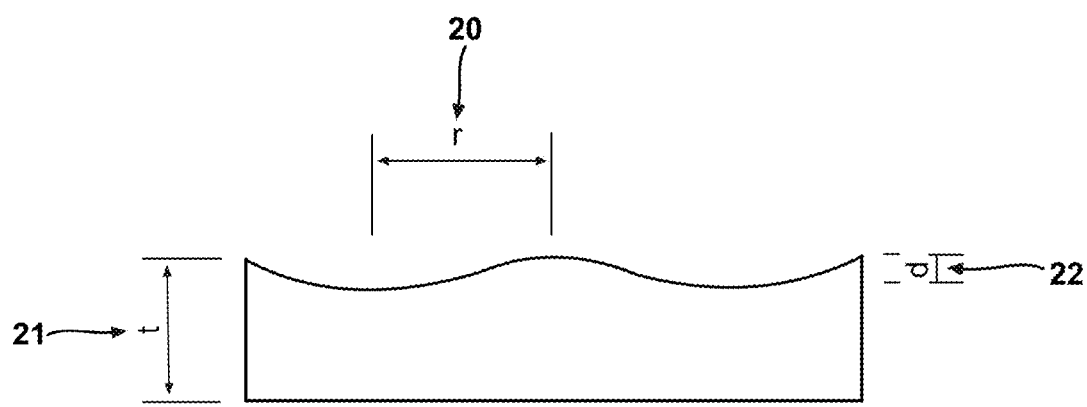
FIG. 7 is a diagram of an aspheric surface used for reduction of optical aberrations.

An embodiment of an aspheric lens, used for reduction of optical aberrations, wherein r 20 represents the radial distance away from the vertex, d 21 represents the displacement of the surface from the vertex, at distance r 20 from the axis and t represents the thickness of the optic substrate 22 is shown in FIG. 7.

For purposes of this specification, headings are not considered paragraphs and thus this paragraph is Paragraph 0029 of the present specification. The individual number of each paragraph above and below this paragraph can be determined by reference to this paragraph's number. In this Paragraph 0029, Applicant discloses an ultrafast laser inscribed structure comprising a substrate, wherein said substrate comprises:

a) a material selected from:
  (i) a unary, binary, ternary, or quaternary a non-glass, crystalline material, preferably said substrate comprises elements selected from the following periodic table groups: II and VI; III and V; IV and VI; VI; II and V and I, III, VI;
  (ii) an amorphous material, preferably said amorphous material comprises a polymer, silicate glass, borate glass, phosphate glass, heavy metal oxide glass, halide glass, chalcogenide glass, preferably said silicate glass is selected from an alkali silicate glass or an alkali-alkaline earth-silicate glass; and/or
  (iii) a ceramic;
b) a plurality of two and/or three dimensional condensed structures, each of said plurality of two and/or three dimensional condensed structures being derived from the substrate material adjacent to said condensed structure, preferably each of said plurality condensing structures comprising a structurally modified, oxidized or alloyed derivative of said adjacent substrate material.

When selecting a substrate for an application space, it is important that the substrate transparent be selected so that the substrate can transmit electromagnetic radiation in the wavelength range of the application space of interest as a nontransparent material will not permit such electromagnetic radiation to be condensed and propagated.

Applicant discloses an ultrafast laser inscribed structure according to Paragraph 0029 wherein said each of said plurality of two and/or three dimensional condensed structures comprises one or more of the following geometric structures: a circular, rectangular, or polygon cross-section, preferably said circular, rectangular, or polygon cross-section have a depth that changes shape as a function of depth; a shape selected from the group consisting of cuboids, cylinders, cones, a helix, pyramids, or a polyhedron.

Applicant discloses an ultrafast laser inscribed structure according to Paragraphs 0029 through 0030 wherein said substrate has: a spherical curvature from about minus a 1000 millimeters to about 1000 millimeters, preferably a spherical curvature from about 25 millimeters to about 500 millimeters; and/or an aspheric curvature of from about minus 1 kilometer to about 1 kilometer, preferably from about 5 millimeters to about 100 millimeters, preferably said aspheric curvature comprises two or more of the following shapes: a hyperbolic, a parabola, an ellipse and a sphere, preferably said aspheric curvature comprises a parabola and a sphere.

Applicant discloses a focal plane array comprising a plurality of pixels and a ultrafast laser inscribed structure according to Paragraphs 0029 through 0031, wherein said ultrafast laser inscribed structure has a change in refractive index per unit depth of substrate and/or plurality of three dimensional condensed structures, preferably said substrate has a tilt angle with respect to said focal plane array of up to about 180 degrees, preferably said substrate has a tilt angle with respect to said focal plane array of 0 degrees to about 180 degrees, preferably from about 0.1 degrees to 180 degrees. Such ultrafast laser inscribed structure allows the skilled artisan to filter the electromagnetic radiation wavelength response per pixel. Thus, the wavelengths of electromagnetic radiation that are incident upon the focal plane array can be determined.

Method of Making an Ultrafast Laser Inscribed Structure

Applicant discloses a method of making an ultrafast laser inscribed structure according to Paragraphs 0029 through 0031, said method comprising: contacting said substrate with one or more pulses of laser light having an energy of about 1 nanojoule to about 100 microjoule for a time of from about 1 femtosecond to about 1 millisecond, said laser light having a focused beam diameter at the contact site on said substrate of 300 nanometers to about 100 microns to form a plurality two and/or three dimensional condensed structures on and/or in said substrate.

Applicant discloses a method according to Paragraph 0033, wherein said substrate is affixed to a focal plane array prior to said contacting step. Here, the structures may be written onto a growth or deposited layer over top of the focal plane array or alternatively written into a layer that is attached to said focal plane array.

Applicant discloses a method according to Paragraph 0033, wherein said ultrafast laser inscribed structure is joined with a focal plane array, preferably said joining comprises chemically adhering said ultrafast laser inscribed structure to said focal array, and/or physically adhering said ultrafast laser inscribed structure to said focal array, preferably said physically adhering comprises adhering via Van der Waals forces or laser microwelding.

Applicant discloses a method according to Paragraphs 0033 through 0035, wherein said substrate has, prior to or after said method of making, a spherical curvature from about minus a 1000 millimeters to about 1000 millimeters, preferably a spherical curvature from about 25 millimeters to about 500 millimeters; and/or an aspheric curvature of from about minus 1 kilometer to about 1 kilometer, preferably an aspheric curvature of from about 5 millimeters to about 100 millimeters, preferably said aspheric curvature comprises two or more of the following shapes: a hyperbolic, a parabola, an ellipse and a sphere, preferably said aspheric curvature comprises a parabola and a sphere.

A method of protecting a focal plane array from intense signals, said method comprising covering said focal plane array with an ultrafast laser inscribed structure according to any of Paragraphs 0029 through 0031. Here, the ultrafast laser inscribed structure has a non-zero nonlinear susceptibility and converts the incident signal of a specified wavelength to either a higher or lower wavelength, which is then prevented from interacting with the focal plane array.

Methods of Making and Using Ultrafast Laser Inscribed Structures

Methods of making and/or using ultrafast laser inscribed structures for signal concentration in focal plan arrays, focal plan arrays, imaging and/or sensing apparatuses comprising said focal plan arrays are disclosed.

Figure 5:
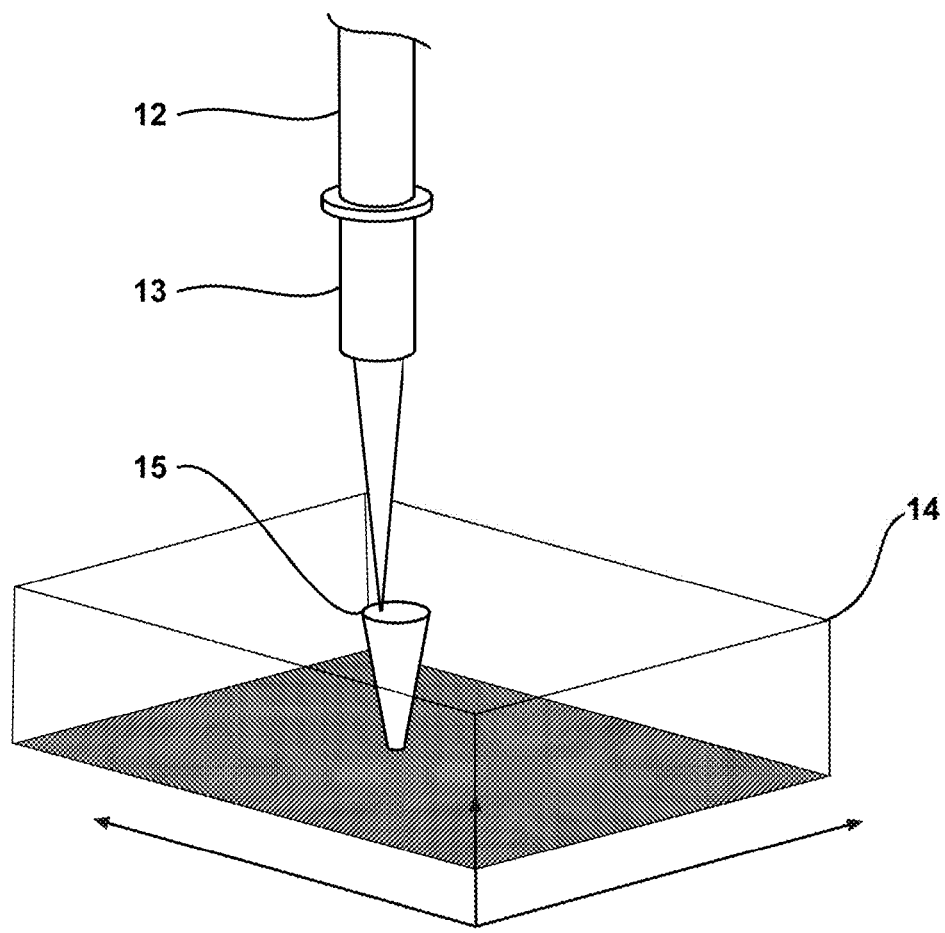
FIG. 5 is a diagram representing the process of utilizing ultrafast laser inscription for production of light condensing structures inside of an arbitrary substrate material.

An embodiment of a process of utilizing ultrafast laser inscription for production of ultrafast laser inscribed light condensing structures 15 in a substrate material 14 using a focusing objective 13 for the ultrafast laser source 12 is shown in FIG. 5.

Test Methods

Wavelength Dependent Pixel Response Test

The wavelength dependent pixel response of a focal plane array is determined as follows:
1.) Determine the initial pixel response at the peak sensitivity of the focal plane array using an optical parametric oscillator (OPO);
2.) Tune the output power of the OPO, having a spectral bandwidth of 10 nm by passing the source through a monochromator, to match the saturation intensity of the pixel that will be tested such that the electrical read out from the pixel remains constant with increasing OPO power without damaging the test pixel;
3.) Record the electrical response that the pixel tested Step 2 above provides during the testing in Step 2 above;
4.) Repeat Steps 2 and 3 for each pixel in the focal plane array;
5.) Normalize the pixel responses collected to the pixel response having the highest electrical output;
6.) Tune the OPO wavelength to wavelength that is 20% higher than the wavelength for the peak sensitivity of the focal plane array from Step 1;
7.) Repeat Steps 2 through 5 using the higher wavelength of Step 6;
8.) Repeat Steps 6 through 7 using each time a wavelength that is:
   40% higher than the wavelength for the peak sensitivity of the focal plane array from Step 1
   60% higher than the wavelength for the peak sensitivity of the focal plane array from Step 1
   80% higher than the wavelength for the peak sensitivity of the focal plane array from Step 1
   100% higher than the wavelength for the peak sensitivity of the focal plane array from Step 1
9.) Tune the OPO wavelength to wavelength that is 20% lower than the wavelength for the peak sensitivity of the focal plane array from Step 1;
10.) Repeat Steps 2 through 5 using the higher wavelength of Step 8;
   40% lower than the wavelength for the peak sensitivity of the focal plane array from Step 1
   60% lower than the wavelength for the peak sensitivity of the focal plane array from Step 1
   80% lower than the wavelength for the peak sensitivity of the focal plane array from Step 1
   100% lower than the wavelength for the peak sensitivity of the focal plane array from Step 1
11.) The results from Steps 1-10 are the normalized system response for the focal plane array and wavelength sensitivity of the subject focal plane array.

Characterization of Ultrafast Laser Inscribed Structures

Optical microscope images are used to evaluate the quality of ultrafast laser inscribed structures. Microscopic images can provide estimates of the quality by looking at the laser-modified structures that comprise the condensing structure. The modified structure geometry and relative modification can be observed.

Surface Curvature (Spherical and/or Aspheric) Test

Surface curvature is measured according to the ISO/TR 14999 standard method.

The wavelength response of an individual condensing structure is measured according to the ISO 13695:2004 standard method.

EXAMPLES

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Sample Preparation and Alignment for Ultrafast Laser Processing

Sample Preparation for Ultrafast Laser Processing

Samples are prepared by first preparing surface quality to decrease the effect of scattering and optical aberrations on the inscription laser. Samples are polished to a scratch-dig specification of 80-50 or better, to minimize the effects of scattering and aberrations. Surface flatness of $\lambda/4$ is needed to prevent focal shift during writing. Before processing samples, each sample is cleaned first with acetone, then methanol, and finally with isopropyl alcohol to remove surface contaminants.

Sample Alignment for Ultrafast Laser Process

Samples are placed on a one, two, or three axis movement stage, with adjustment for the focusing optic of the laser—as will be appreciated by the skilled artisan, the choice between a one, two, or three axis movement stage is driven by the geometry of the desired laser inscribed structure. The retroreflected signal from the sample is monitored to view the size of the retroreflected laser spot. The focal spot is then maximized, producing an image of the sample surface, using either the focal length adjust of the laser focusing optic or the adjustment of the movement stage.

Sample Alignment and Movement Geometry

Samples having a variance in geometry require movement mapping to prevent unwanted modification changes. The sample can either be mapped with a surface profilometer or manually by measuring the focal shift of the retroreflected beam at different points across the sample.

Example 1 Light Condenser for a Focal Plane Array

A ZnSe sample was prepared as described above and then conical structures were inscribed in such sample in a 10×10 array. The laser utilized was an ytterbium fiber laser, with a pulse width of 600 fs, repetition rate of 100 kHz, and average power of 150 mW. The laser was focused inside of the ZnSe substrate with a 4 mm focal length (NA=0.55) aspheric lens. The attainable focal spot size inside of the material was approximately ~2 µm. The conical structures were designed for a focal plane array of 10×10 pixels, with each pixel spaced by 100 µm. The conical structures consisted of a 60 µm diameter top and a 10 µm bottom. A substrate of ZnSe was exposed to the laser pulses from the ytterbium fiber laser, while being translated in a helical pattern. The translation pattern consisted of helical patterns arranged in a 10×10 array. Each element of the 10×10 array was inscribed separately by the ytterbium fiber laser in a helical cone pattern, with the diameter of the cone increasing from 10 µm on the bottom to 60 µm on the top. Each conical structure had a NA of approximately 0.4 with variation between each structure of up to 25%. The loss experienced by a 2 µm laser propagating through a single conical structure in the 10×10 array was approximately 2.9 dB. The fabricated array is mounted to a focal plane array for increasing signal strength by directly contacting the substrate to the focal plane array and then epoxying the substrate to the mounting board of the focal plane array. Such signal strength as measured by the intensity of light is increased by approximately eight times.

Example 2 Harmonic Converting Condenser

A lithium niobate sample is prepared as described above and then conical structures were inscribed in such sample in a nonlinear conversion material in a 10×10 array. A mode-locked laser, which is transparent to the nonlinear material, and that has the following parameters: a pulse width of 300 fs, repetition rate of 200 kHz, average power of 100 mW is employed. The laser is focused inside of the lithium niobate sample with a 4 mm focal length (NA=0.55) aspheric lens. The attainable focal spot size inside of the material is approximately ~2 µm. Utilizing a nonlinear material as the substrate allows this technique to be used for sensor protection, converting light to a wavelength region outside of the sensitivity of the FPA. If an intense laser pulse is incident on the focal plane array, the conical structure condenses the incident laser pulse in the nonlinear material. The increased intensity then starts to generate the second harmonic of the incident laser pulse. The back side of the lithium niobate sample can then be coated with a highly reflective thin film coating designed such that the second harmonic is reflected. Thus, a light condensing structure that converts laser light to a wavelength that will not damage or interact with the focal plane array. Such structure is placed over a focal plane array to protect the focal plane array from laser damage.

Example 3 Mosaic Focal Plane Array

A ZnSe sample was prepared as described above and then conical structures were inscribed in such sample in a 10×10 array. The laser utilized was an ytterbium fiber laser, with a pulse width of 600 fs, repetition rate of 100 kHz, and average power of 150 mW. The laser was focused inside of the ZnSe substrate with a 4 mm focal length (NA=0.55) aspheric lens. The attainable focal spot size inside of the material was approximately ~2 µm. The conical structures were designed for a focal plane array of 10×10 pixels, with each pixel spaced by 100 µm. The conical structures consisted of a 60 µm diameter top and a 10 µm bottom. A substrate of ZnSe was exposed to the laser pulses from the ytterbium fiber laser, while being translated in a helical pattern. The translation pattern consisted of helical patterns arranged in a 10×10 array. Each element of the 10×10 array was inscribed separately by the ytterbium fiber laser in a helical cone pattern, with the diameter of the cone increasing from 10 µm on the bottom to 60 µm on the top. Each conical structure was inscribed with a periodic change in the refractive index, such that the transmissited wavelength of light was maximized for a narrow wavelength range. Said conical structures were arranged in a Bayer filter style layout to allow spectral mosaicking of the focal plane array. The fabricated array was mounted to a focal plane array for decoupling wavelength response of each pixel in the array by directly contacting the substrate to the focal plane array and then epoxying the substrate to the mounting board of the focal plane array.

Example 4 Curved Substrate Array

A curved substrate is prepared as described above. Preferably, said substrate is a curved substrate with one side flat and one side convex, similar to a plano-convex lens, having a radii of curvature up to 1000 mm. Said substrate is placed with the flat interface towards the inscription laser source. This is done to allow structures to be inscribed in the substrate without significant aberrations to the incident beam. Conical structures are arranged in an array, representative of the focal plane array size. The laser inscribed structures are written in an arc such that the laser inscribed structures intersect the curved surface at normal incidence. Structures near the middle of the curved substrate propagate vertically with no arcing. Conical structures should be designed such that the whole of the inscribed structure propagates as close to the surface of the substrate as possible.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. An ultrafast laser inscribed structure comprising a substrate, said substrate comprising:
   a) a material selected from:
      (i) a unary, binary, ternary, or quaternary a non-glass, crystalline material;
      (ii) an amorphous material; and/or
      (iii) a ceramic;
   b) a plurality of two and/or three dimensional condensed structures, each of said plurality of two and/or three dimensional condensed structures being derived from the substrate material adjacent to said condensed structure
   c) said substrate comprises elements selected from the following periodic table groups: II and VI; III and V; IV and VI; VI; II and V and J, III, VI;
   d) said amorphous material comprises a polymer, silicate glass, borate glass, phosphate glass, heavy metal oxide glass, halide glass, chalcogenide glass; and
   e) each of said plurality condensing structures comprising a structurally modified, oxidized or alloyed derivative of said adjacent substrate material.

2. The ultrafast laser inscribed structure of claim 1 wherein said each of said plurality of two and/or three dimensional condensed structures comprises one or more of the following geometric structures:
   a) a circular, rectangular, or polygon cross-section; and
   b) a shape selected from the group consisting of cuboids, cylinders, cones, a helix, pyramids, or a polyhedron.

3. The ultrafast laser inscribed structure of claim 2 wherein said circular, rectangular, or polygon cross-section have a depth that changes shape as a function of depth.

4. The ultrafast laser inscribed structure of claim 1 wherein said substrate has:
   a) a spherical curvature from about minus a 1000 millimeters to about 1000 millimeters; and/or
   b) an aspheric curvature of from about minus 1 kilometer to about 1 kilometer.

5. The ultrafast laser inscribed structure of claim 4 wherein said substrate has
   a) a spherical curvature from about 25 millimeters to about 500 millimeters; and/or
   b) an aspheric curvature of from about 5 millimeters to about 100 millimeters.

6. The ultrafast laser inscribed structure of claim 5 wherein said aspheric curvature comprises two or more of the following shapes: a hyperbolic, a parabola, an ellipse and a sphere.

7. The ultrafast laser inscribed structure of claim 5 wherein said aspheric curvature comprises a parabola and a sphere.

8. A method according to claim 5, wherein said ultrafast laser inscribed structure is joined with a focal plane array.

9. A method according to claim 8, wherein said joining comprises chemically adhering said ultrafast laser inscribed structure to said focal array, and/or physically adhering said ultrafast laser inscribed structure to said focal array.

10. A method according to claim 9, wherein said physically adhering comprises adhering via Van der Waals forces or laser microwelding.

11. A focal plane array comprising a plurality of pixels and an ultrafast laser inscribed structure according to claim 1, wherein said ultrafast laser inscribed structure has a change in refractive index per unit depth of substrate and/or plurality of three dimensional condensed structures.

12. A focal plane array according to claim 11 wherein said substrate has a tilt angle with respect to said focal plane array of up to about 180 degrees.

13. A method of making an ultrafast laser inscribed structure according to claim 1, said method comprising: contacting said substrate with one or more pulses of laser light having an energy of about 1 nanojoule to about 100 microjoule for a time of from about 1 femtosecond to about 1 millisecond, said laser light having a focused beam diameter at the contact site on said substrate of 300 nanometers to about 100 microns to form a plurality two and/or three dimensional condensed structures on and/or in said substrate.

14. A method according to claim 13, wherein said substrate is affixed to a focal plane array prior to said contacting step.

15. A method according to claim 13 wherein said substrate has one or more of the following properties prior to or after said method of making:
   a) a spherical curvature from about minus a 1000 millimeters to about 1000 millimeters; and
   b) an aspheric curvature of from about minus 1 kilometer to about 1 kilometer.

16. A method of protecting a focal plane array from intense signals, said method comprising covering said focal plane array with an ultrafast laser inscribed structure according to claim 1.

* * * * *